Nov. 27, 1928.                                              1,693,475
J. S. CLAPPER
LAWN MOWER
Filed Nov. 7, 1921        5 Sheets-Sheet 1

INVENTOR
JOHN S. CLAPPER
By [signature]
ATTORNEYS

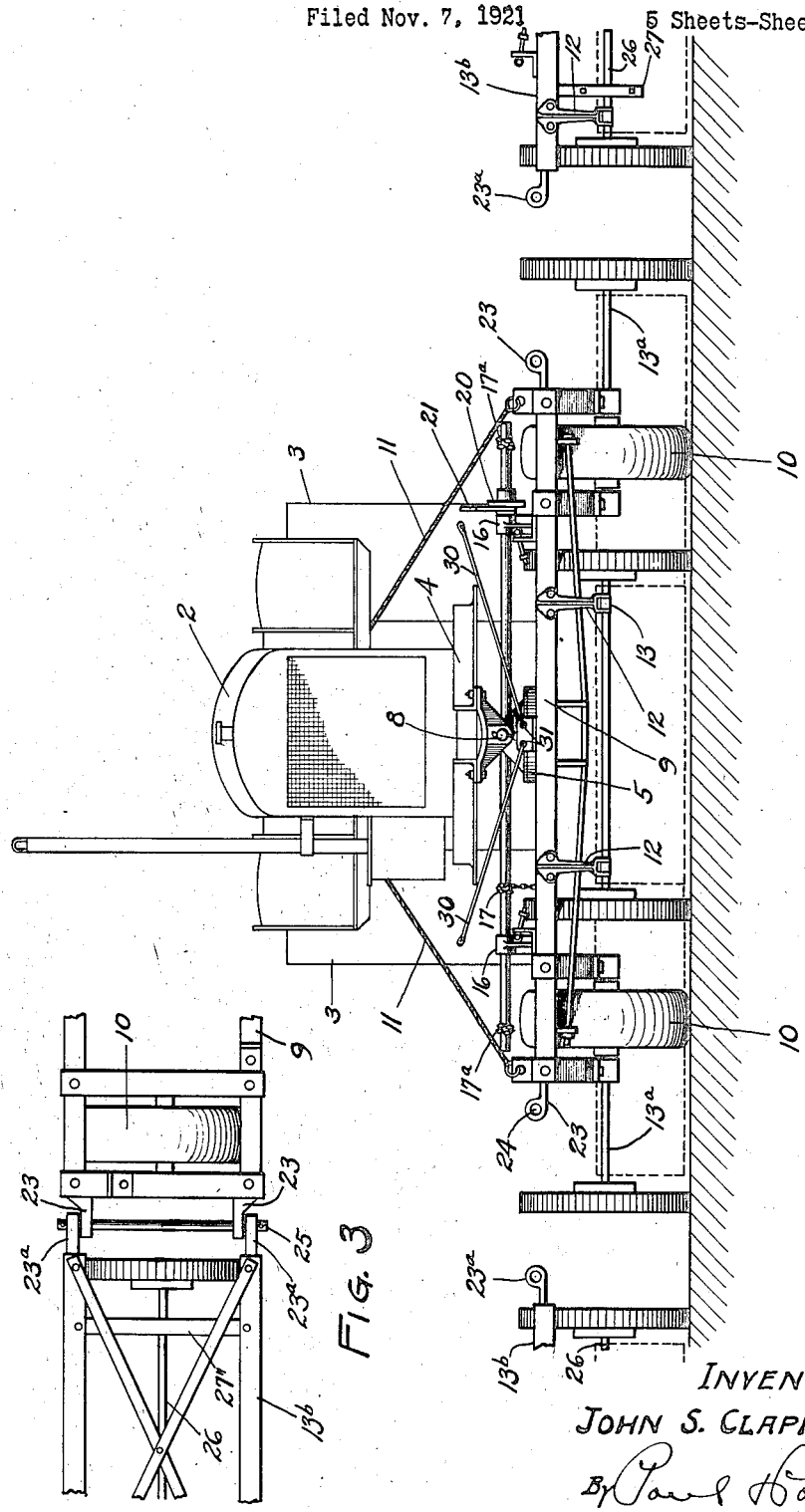

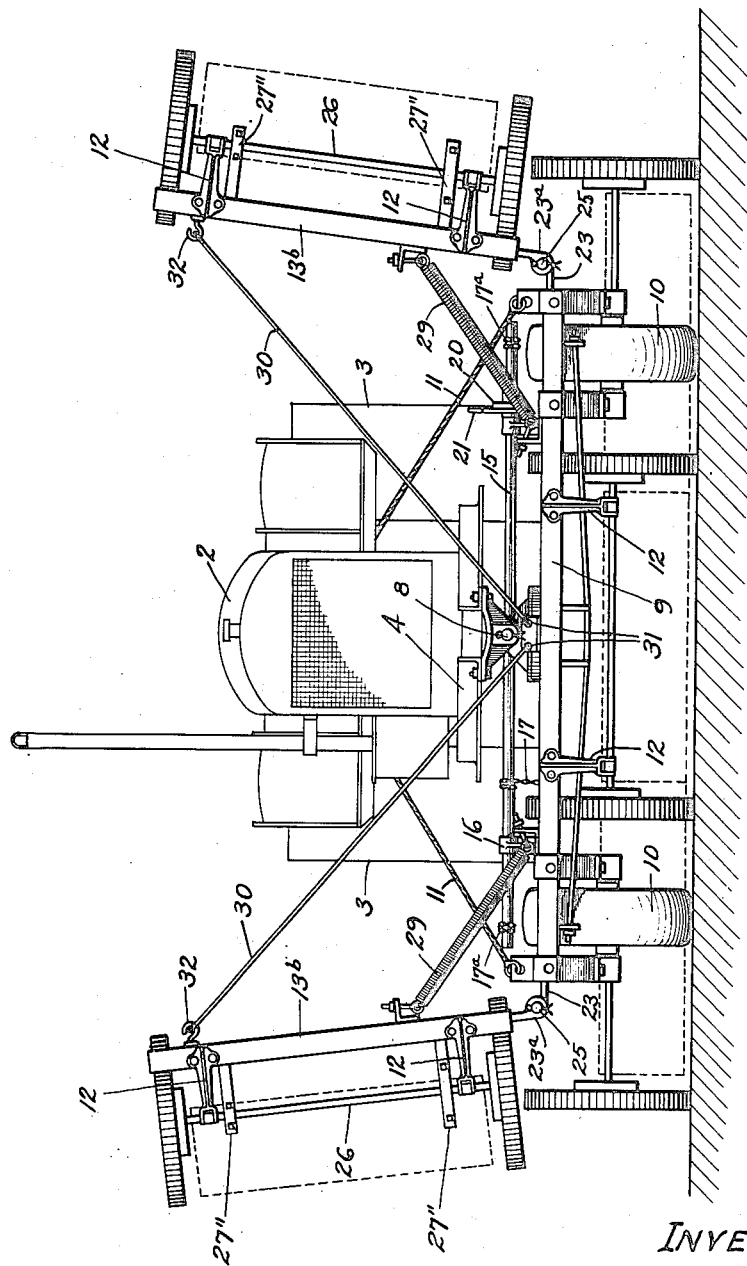

Nov. 27, 1928.

J. S. CLAPPER 1,693,475

LAWN MOWER

Filed Nov. 7, 1921    5 Sheets-Sheet 4

INVENTOR
JOHN S. CLAPPER
By Paul Howl
ATTORNEYS

Nov. 27, 1928.

J. S. CLAPPER

LAWN MOWER

Filed Nov. 7, 1921

1,693,475

5 Sheets-Sheet 5

INVENTOR
JOHN S. CLAPPER

BY *Paul Paul*

ATTORNEYS

Patented Nov. 27, 1928.

1,693,475

UNITED STATES PATENT OFFICE.

JOHN S. CLAPPER, OF MINNEAPOLIS, MINNESOTA, ASSIGNOR TO TORO MANUFACTURING COMPANY, OF MINNEAPOLIS, MINNESOTA, A CORPORATION OF MINNESOTA.

LAWN MOWER.

Application filed November 7, 1921. Serial No. 513,530.

My invention relates to improvements in power driven golf or large lawn mowing machines and the objects of the invention are:

First: To provide a mowing machine having a wide cut, about twelve feet, but adapted for quick and convenient adjustment for movement from place to place on a highway or through a gate or narrow road or across a bridge, without in any way dismantling the mowing machine or units.

Second: A further object is to provide a mower frame of such construction that the middle unit or section can be easily and quickly adapted for use as the forward truck of a tractor when it is used for other purposes than mowing.

Third: To provide a series of mowing units so arranged transversely of the machine that each unit may adapt itself automatically to the incline of the lip or bank of a bunker or the incline around a green, or the surface of a mound or cop, and will also adapt itself to the varying levels of a narrow valley or swale.

Other objects of the invention will appear from the following detailed description.

The invention consists generally in various constructions and combinations, all as hereinafter described and particularly pointed out in the claims.

Figure 1:
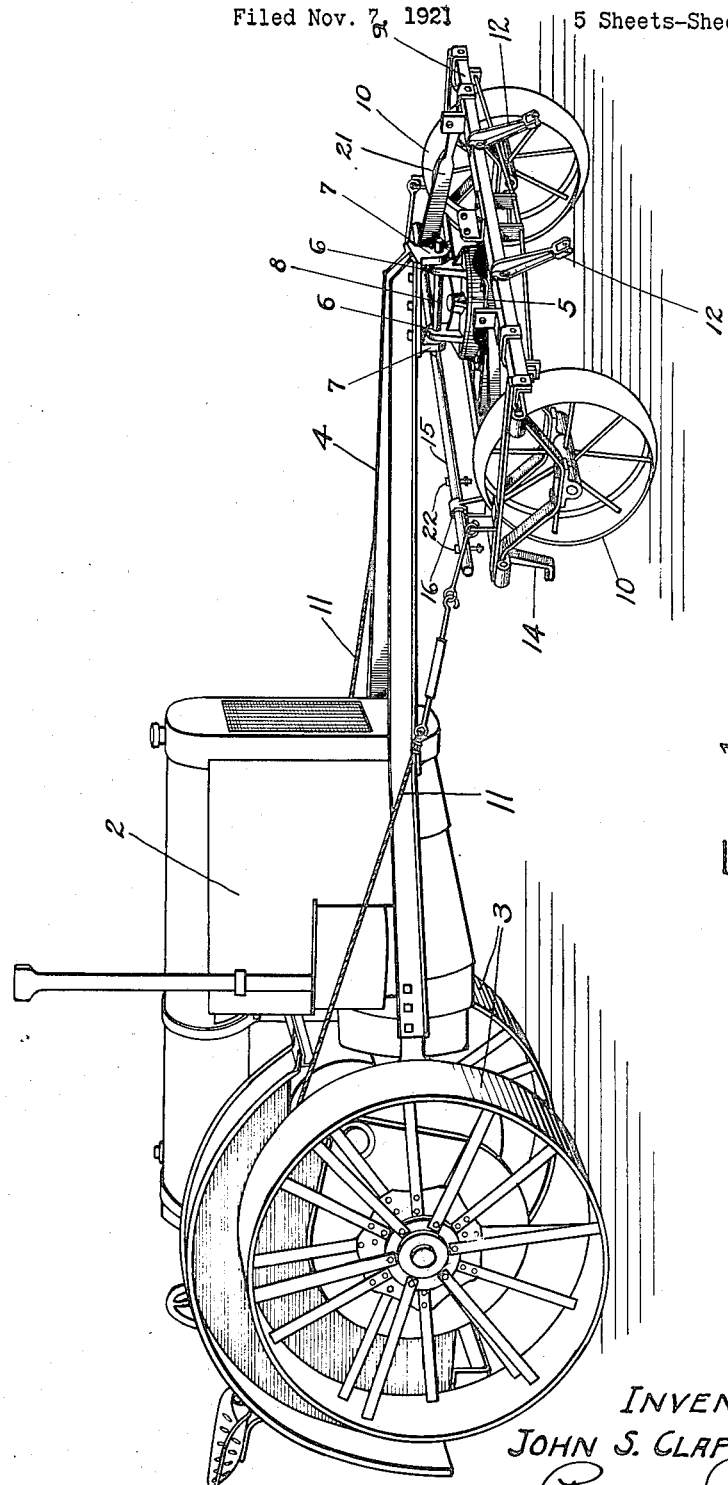
Figure 5:
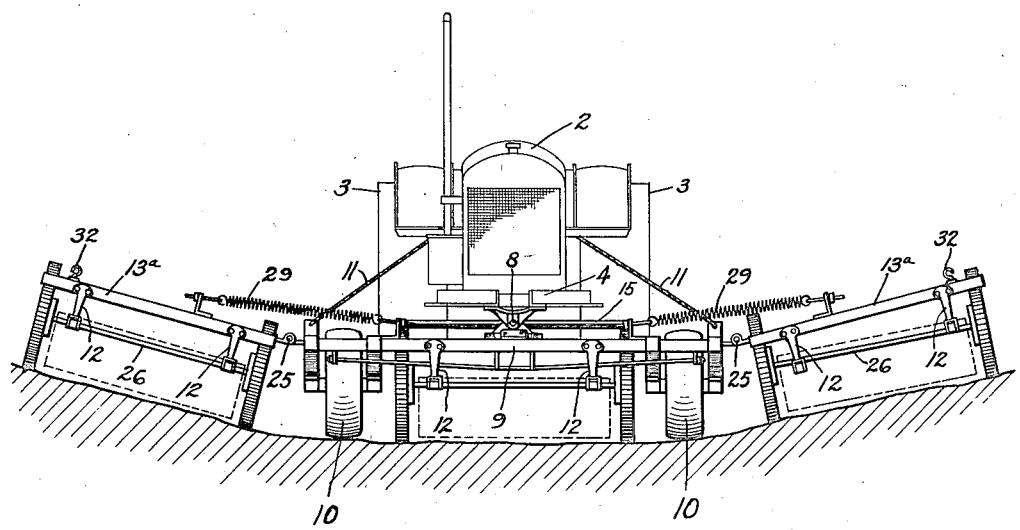
Figure 6:
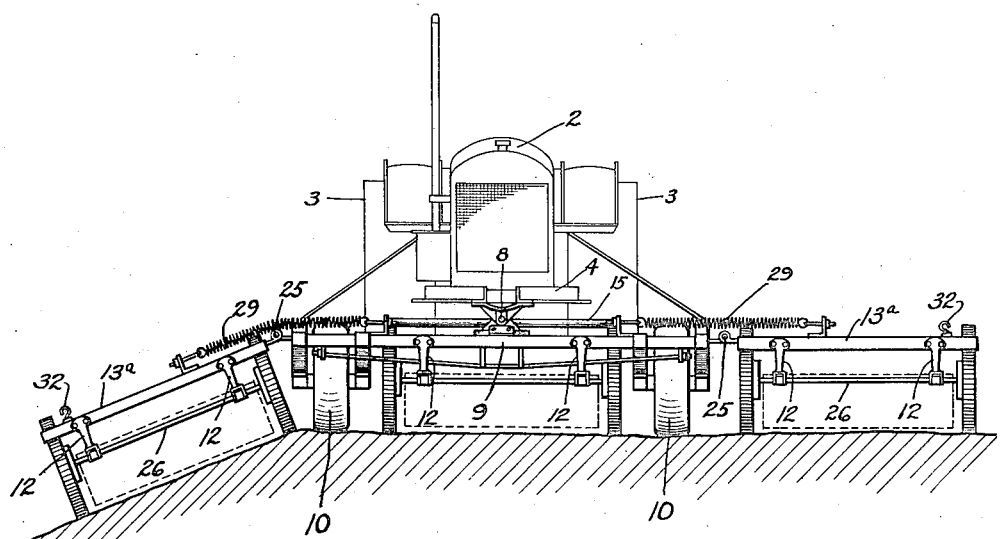
Figure 7:
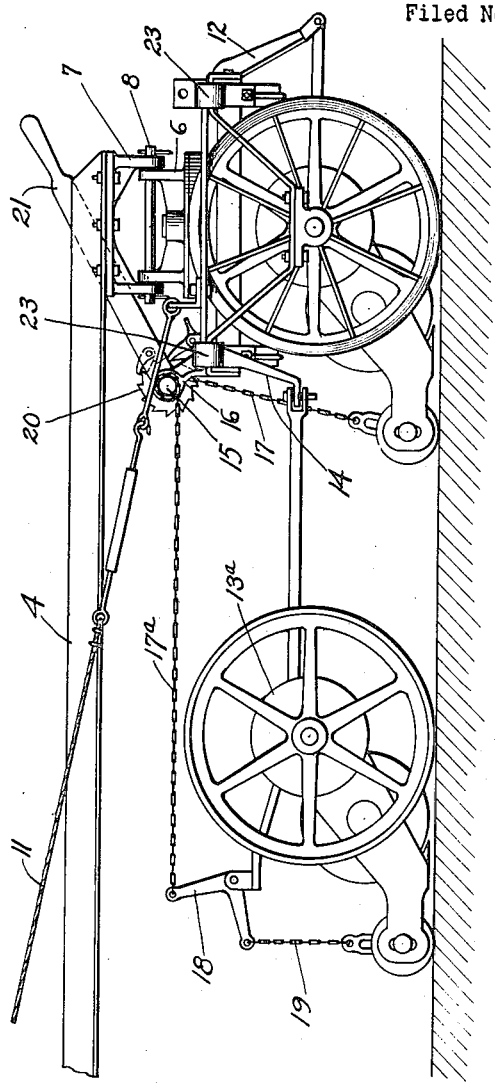
Figure 8:
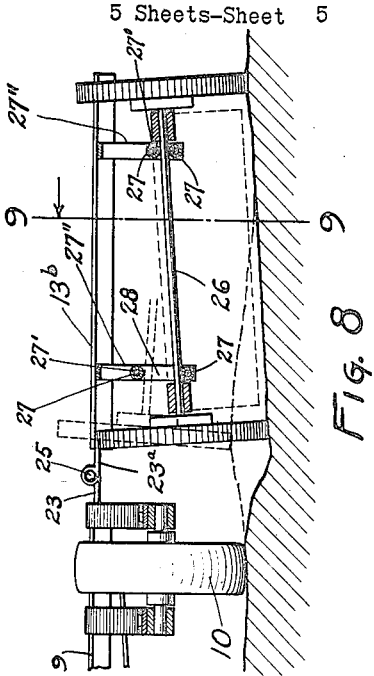
Figure 9:
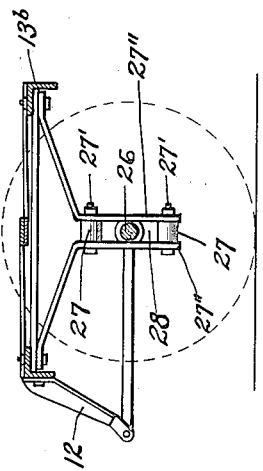

In the accompanying drawings forming part of this specification,

Figure 1 is a perspective view of a tractor wherein the middle section of the mowing frame is shown, adapted for use as a forward truck of the tractor, Figure 2 is a front elevation of the machine, showing the end units detached from the middle section, Figure 3 is a detail view, showing the preferred means for connecting the end mowing units to the middle section, Figure 4 is a similar view, showing the end units tilted to a non-working position to adapt the machine for travel on a highway or to pass through a gate or over a bridge, Figure 5 is a front view showing the position assumed by the end units in mowing the swale, Figure 6 is a similar view, showing one of the units tilted downwardly in mowing the bank of a bunker, Figure 7 is a side elevation of the forward portion of the machine, showing the means for raising the mowing reels, Figure 8 is a detail view, showing the manner of mounting the shaft of the mowing units in its frame, Figure 9 is a sectional view on the line 9—9 of Figure 8.

In the drawing, 2 represents the tractor proper, having the usual carrying wheels 3 and a forwardly projecting frame 4 which for convenience of description may be designated as the reach part of the machine. 5 is the fifth wheel having the usual vertical king bolt pivot, 6 lugs projecting upwardly from said wheel, 7 corresponding lugs depending from the frame 4, and 8 a rod passing through the lugs 6 and 7 and forming a horizontal pivot for the forward portion of the tractor. 9 represents the middle section of the mower frame, provided with carrying wheels 10 journaled in suitable bearings on the frame 9, and with said frame forming in effect a truck for the forward portion of the tractor. Cables 11 are connected to each end of this truck frame and extend back to a suitable steering device on the tractor by means of which the driver can oscillate the mower frame and steer the machine. The vertical and horizontal pivotal connections of the middle section with the tractor allow it to rock or tilt as the machine moves over the ground, and adjust itself to an inclined surface.

When this middle section of the mower frame is utilized as a truck, the tractor may be driven from place to place on the lawn of the estate or on golf links, and utilized for other purposes than mowing.

By using the center section of the mower frame as a truck frame, I dispense entirely with the usual forward truck for the tractor and can save much labor and time, as it is only necessary to detach the end sections and remove the reels to equip the apparatus for ordinary uses as a tractor, while in mowing outfits of this kind as usually constructed it is necessary to detach the entire mower frame and substitute the usual supporting trucks therefor.

Hangers 12 are mounted on the forward portion of the frame 9 and to these hangers the central mowing reel 13 is connected. Corresponding mowing reels 13ª are provided in the rear of the frame 9 and connected therewith by means of suitable draft hangers 14. These rear reels are arranged to lap the cut of the center reel, as usual in mowing machines of this type. For the purpose of tilting these reels to regulate the cut or to lift them to a non-working position, I provide a shaft 15 supported in bearings 16 on the middle section of the tractor and connected with the reel 13 by suitable flexible means, such as a chain 17 and by a similar connecting means 17ᵃ with one arm of a bell crank 18 which has its other arm connected by flexible means, 19, with the rear reels 13ᵃ. A ratchet mechanism 20 and an operating lever 21 allows the operator to raise and lower the reels, as desired. Bolts 22 are mounted in the shaft 15 by means of which the lifting chains can be conveniently attached thereto. At each end of the middle section 9 of the mowing frame I provide outwardly projecting ears 23 and the end reels 13ᵇ have corresponding ears 23ᵃ thereon. In these ears sockets 24 are provided to receive rods 25 by means of which the end reels are pivotally connected to the ends of the center section of the mowing frame. These end units are in front of and lap the rear units 13ᵃ, as usual in mowing machines of this type, and each end unit is free to tilt on its connection with the center section and adapt itself automatically to inclined or uneven surfaces over which the machine may be moving. For instance, in mowing around a bunker, a portion of the mowing surface will be raised and the end unit will tilt upwardly to accommodate itself to such surface. At another part of the bunker a downwardly inclined bank will be reached and there the mowing unit will tilt downwardly, as shown in Figure 6, and allow the operator to mow the grass on the bank and lip of the bunker with his power machine, where ordinarily it has been necessary to mow by hand, as the rigid machines in general use could not be successfully operated on the walls or slopes. The same is true, of course, of the banks or lips around the edge of a green or artificial caps or mounds which may be found at different points on the golf course.

As shown in Figure 8, the shaft 26 of the mowing units 13ᵇ is held against vertical movement at one end by suitable means, such as collars 27 on bolts 27' placed near together in the frame of the reel, while at the other end a gap 28 is provided between said collars which allows relative tilting or vertical movement of one end of the reel frame and the adjacent wheel to allow the reel to adapt itself to the surface over which it may be moving. The bolts 27' pass through depending straps 27'' at each end of the mowing unit frame.

I prefer to provide tension springs 29 connecting the end sections with the middle section and normally tending to hold the end and middle sections in horizontal alinement. These springs, however, will yield under tension thereon and permit the end reels to drop or tilt out of alinement with the middle section, as the uneven surfaces of the golf courses or lawn may require. When these end units are tilted to a raised, non-working position, I provide rods 30 pivotally connected at 31 to the middle section and having eyes at their opposite ends to engage hooks 32 on the frames of the outer units for securely supporting these units in a tilted position, and during such time the machine may be easily and quickly moved from place to place along the highway or driven over a narrow bridge or through a gateway which would be impossible with all the reels in mowing alinement.

To separate the end reels from the middle section it is only necessary to remove the rods 25, disconnect the springs 29 and the apparatus may then be used with three reels, or, if preferred, these may be detached and the middle section of the mower frame utilized only as a supporting truck for the forward portion of the tractor.

I claim as my invention:

1. A tractor having a forwardly projecting frame, a section having supporting wheels and a pivotal connection with said projecting frame to form a truck therefor, sections having hinged connections with the ends of said truck section for following an incline when said truck section is running on level ground, mowing reels connected with said sections, and said end sections being readily removable from said truck section.

2. The combination, with a tractor, of a mower frame comprising a middle section pivotally connected with said tractor frame, end units forming lateral extensions of said middle section, means pivotally connecting said end units with said middle section, and springs normally tending to resist downward tilting of said end units.

3. The combination, with a tractor frame of a middle section pivotally connected therewith, end mowing units pivotally connected with said middle section to form lateral extensions thereof, said end units being adapted for tilting on a transverse axis to a substantially upright position, and means for holding said units in said position.

4. The combination, with a tractor frame, of a mower frame comprising a middle section pivotally connected with said tractor frame, and free to oscillate on a vertical axis, end units connected with said middle section and each comprising a frame and axle and wheels, one end of said axle being mounted to rise and fall vertically in its frame bearing, for the purpose specified.

5. The combination, with a tractor frame, of a mower frame comprising middle and end sections, said middle section having a swivel connection with said tractor frame, said end sections being pivotally connected with said middle section, the frame of each end section having hangers therein and the axles of said end sections having bearings in said hangers, one end of each axle being free to rise and fall in its bearing.

6. The combination with a tractor having a forwardly projecting frame, of a section having a pivotal supporting connection with said projecting frame and forming a truck therefor, a section having one end hinged to said truck section and adapted to swing on a transverse axis with respect to said truck section, and implements connected with said sections.

7. The combination with a tractor having driving wheels and a forwardly projecting frame, of a middle frame section having a pivotal king bolt connection with the projecting frame of said tractor and forming a supporting truck therefor, and end sections abutting the ends of said middle section and connected therewith for vertical independent movement, and implements connected with said middle and end sections.

8. The combination with a tractor having driving wheels and a forwardly projecting frame, of a middle frame wheeled section supporting the forward portion of said tractor frame, end sections placed end to end with respect to said middle section and connected therewith for independent vertical movement, said end sections being removable to adapt the middle section for use as a truck, and implements connected with said middle and end sections.

9. The combination with a tractor having a forwardly projecting frame, of a section having vertical and horizontal pivotal connections with said frame to rock on a vertical and horizontal axis and form a truck for said frame, and an end section having transverse pivotal connection with said truck section, and implements connected with said sections.

10. The combination with a tractor having a forwardly projecting frame, of a middle section having vertical and horizontal pivotal connections with said frame to rock on a vertical and horizontal axis and form a supporting truck for said frame, and end sections having transverse pivotal connections with the ends of said truck section respectively, and implements connected with said sections.

In witness whereof, I have hereunto set my hand this 2nd day of November, 1921.

JOHN S. CLAPPER.